Feb. 9, 1937.  F. E. STAHL  2,069,980
METHOD OF MAKING CHAIN LINKS
Filed July 11, 1935   2 Sheets-Sheet 1
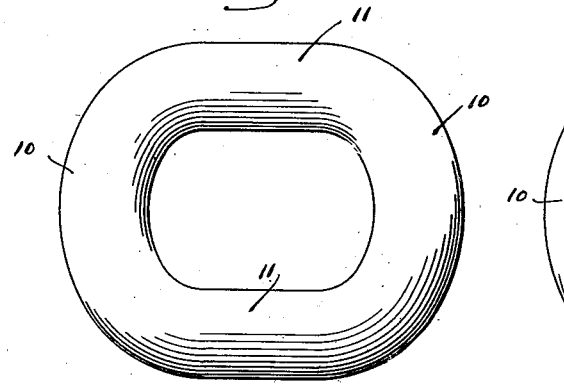
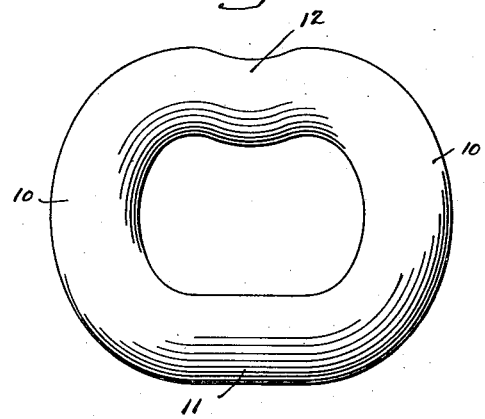
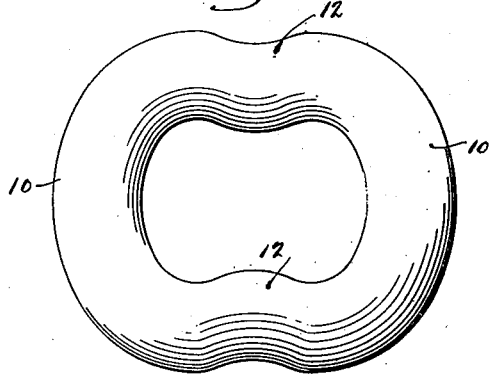
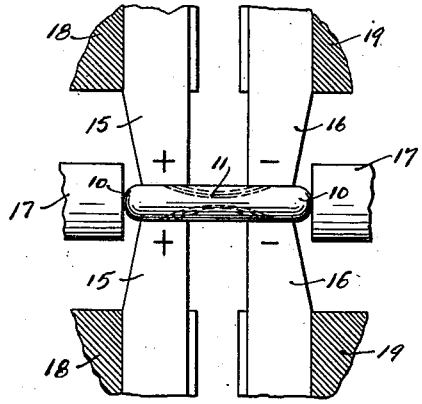
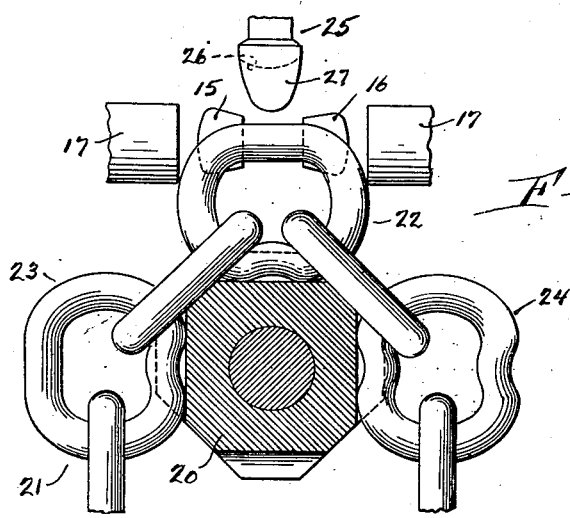
Inventor,
FRANK E. STAHL
by
Attorney.

Feb. 9, 1937.                F. E. STAHL                2,069,980
METHOD OF MAKING CHAIN LINKS
Filed July 11, 1935           2 Sheets-Sheet 2

Inventor,
FRANK E. STAHL
by
Ellis
Attorney.

Patented Feb. 9, 1937

2,069,980

UNITED STATES PATENT OFFICE 2,069,980

METHOD OF MAKING CHAIN LINKS

Frank E. Stahl, Tonawanda, N. Y., assignor to Columbus McKinnon Chain Corporation, Tonawanda, N. Y., a corporation of New York Application July 11, 1935, Serial No. 30,857

7 Claims. (Cl. 59—35)

My method relates in general to the manufacture of chain links, and particularly to the manufacture of links used in rotary kilns.

It is well known to those skilled in the art that in the use of rotary kilns for treating slurry, it is desirable that the chains used present as much exterior surface as is possible. To this end links are used which are deformed so as to make it possible to increase the number of links in a given length of chain and thereby present greater chain surface area to the slurry.

The object of the present invention is to provide a method of manufacturing links for such chains which is simple and economical.

In order to manufacture a link of the above mentioned type, and to carry out the object of my invention, I show in the accompanying drawings, which form a part of this application, fragmentary portions of one form of apparatus for carrying out the invention, it being obvious that other forms of apparatus may be used for accomplishing substantially the same results. In the drawings:

Fig. 1 is a side elevation of a chain link of the ordinary type before being acted upon in accordance with my method.

Fig. 2 is a similar view showing the link in the course of its manufacture.

Fig. 3 is a similar view of my completed link.

Fig. 4 is a fragmentary, sectional, plan view of a portion of the apparatus for carrying out one step of my process.

Fig. 5 is a fragmentary, transverse, sectional elevation of other portions of the apparatus.

Figure 6:
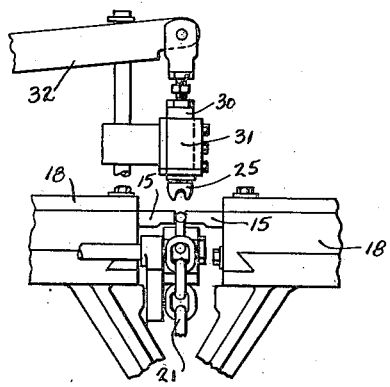
Fig. 6 is a fragmentary end view of further portions of apparatus for carrying out my invention.

Referring to Figs. 2, 3, and 5, where I show the links which are made in accordance with my process, the link, before being acted upon by the process, is of the conventional type having curved ends 10 and two substantially straight sides 11 joining the curved ends, as shown in Fig. 1. In the process of manufacture, the straight sides 11 are heated and pressed inwardly by suitable apparatus to form the inwardly bent sides 12. It will be obvious, therefore, that by bending the sides inwardly, the link is somewhat shortened while maintaining the same surface area as that of the blank shown in Fig. 1, whereby a greater number of links may be used in a given length of chain, thus increasing the chain surface area for contact with the slurry.

In carrying out my method with the larger sized links, it is, of course, necessary that the portion to be bent be heated in order that the metal may be conveniently bent and in order that the bend be localized. This heating may be accomplished in any one of a number of desired ways, but I have found it most practical to use electricity. In Figs. 4 and 5, I show fragmentary portions of means whereby the sides 11 of the link blank may be heated. These means comprise two oppositely arranged positive electrodes 15 and two oppositely arranged negative electrodes 16, thus providing two pairs of electrodes, one on each side of the link blank. The pairs of electrodes, as shown in Fig. 4, are also spaced as to heat the desired length of straight side 11 when current is applied. The electrodes 15 and 16 are carried by suitable electrode holders 18 and 19 which are, of course, actuated by suitable means (not shown) to bring the electrodes into contact with the link blank when it is to be heated and to retract such electrodes from the link so that the same may be released when they have performed their function. Also shown in Fig. 4 are two oppositely arranged holding plungers 17 which are brought into engagement with the blank by suitable apparatus (not shown) in timed relation with the actuation of electrodes 15 and 16 so as to centralize the blank and to hold it while it is being acted upon in accordance with my invention.

In Fig. 5, which shows in fragmentary manner some of the parts shown in Fig. 4, I also show a feed wheel 20 around which the chain 21 is passed. It is obvious that while I show in Figs. 1 to 3 individual chain links, this is, of course, for clearness of illustration and in the actual manufacture of these links they are engaged with each other in the form of a chain 21, as shown in Fig. 5. This chain is threaded through the machine (not shown) and engages with the parts shown in fragmentary manner in Figs. 4 and 5, so that the straight sides 11 of the links may be acted upon in accordance with my invention. In Fig. 5, the feed wheel 20 is actuated periodically by suitable means (not shown) to carry each alternate link into the position shown by link 22. In such position, as hereinbefore described, it will be held by the holding plungers 17 and the electrodes 15 and 16 will be brought into contact therewith while being so held. In this figure, the links 23 and 22 have been partly acted upon and the link 24 has been completely acted upon.

Figure 7:
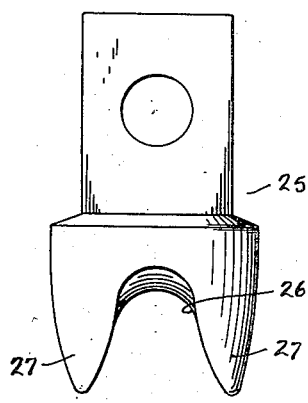
Fig. 7 is an enlarged, face view of the bending tool used in carrying out my method.
Figure 8:
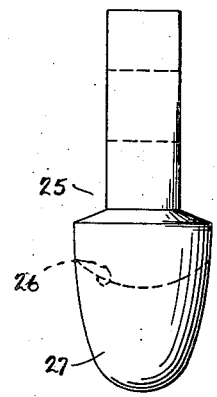
Fig. 8 is a side elevation of the same.

In Figs. 7 and 8, I show one form of bending tool 25 which may be used in carrying out my method. As particularly shown in Fig. 7, the outer working end of the tool is bifurcated, thus providing a working surface 26 which is formed by the body of the tool 25 and by the two side members 27. As viewed in Fig. 7, this tool is so proportioned that the curvature at the bottom of the side portions 27 will fit the transverse sectional curvature of the straight side 11 of the chain link. The surface 26 as viewed from the side, as in Fig. 8, is also curved at such a radius that it will produce the curvature of the bent side 12 of the finished link.

The bending tool is positioned above the portion of the sides 11 of the link when held in position by means of the holding plungers and electrodes 15 and 16, as shown in Fig. 7, and it is provided with suitable means for causing it to reciprocate vertically. These means may be of any suitable type but for convenience I have shown a plunger 30 mounted for vertical reciprocation in a guide block 31. This guide block is suitably carried in a stationary manner by any part of the apparatus, and the plunger is actuated by means of a rocker arm 32. The rocker arm is controlled by suitable cam means (not shown) but so timed in relation to the actuation of the electrodes 15 and 16, the holding plunger 17, and the feed wheel 20, that the bending tool will be brought into engagement with the side 11 of the link after the same has been sufficiently heated. It is obvious that the bending tool is so proportioned that when it is brought into engagement with the heated straight side 11 of the link to form the bent side 12, it will pass in between the electrodes 15 and 16.

In carrying out my invention by the apparatus shown, the alternate links are fed to the position shown in Figs. 4, 5, and 6 by means of the feed wheel 20. When they are in position, the holding plungers are brought into engagement with the ends 10 of the link which serve to maintain it in position. Simultaneously with the actuation of the holding plungers or slightly thereafter, the electrodes 15 and 16 are brought into engagement and firm contact with the sides of the link at points near the ends of the straight side portion 11. Electricity is now caused to flow through the electrodes by any suitable means (not shown) and the metal in the straight side 11 between the electrode is heated in well known manner. When the metal has reached the desired forging temperature, the bending tool 25 is brought down into engagement with the straight side 11 and with the side portions 27 straddling the side of the link. The curved working surface 25 will thus be brought into engagement with the side 11 and suitable force applied thereto through suitable cam means (not shown) to cause the heated metal in the sides 11 to be forced downwardly and formed into the bent sides 12 of the link.

It will be clear from Figs. 5 and 6 that each alternate link is acted upon on one of its sides as it passes into and through the apparatus used for heating and bending, the intermediate links being acted upon either by being repeatedly passed through the same apparatus or by being passed through another heating and bending apparatus. If, as disclosed in this application, each straight side 11 of the link is bent separately, then the links will have to be passed again through the apparatus to bend the opposite sides.

While I have shown and described the bending of only one of the straight sides 11 of the link at a time, it is obvious that a slightly modified apparatus might be employed whereby both straight sides of the link might be heated simultaneously and both sides simultaneously bent, my invention being of such a scope as to include such a modification.

Having thus described my invention, what I claim is:

1. A method of forming chain links for use in the treatment of wet slurry, comprising holding the link by endwise pressure, heating one of the sides thereof by the application to such side of oppositely arranged electrodes, and bending the side of the link inwardly toward the longitudinal axis thereof while hot by exerting pressure which is independent of the holding pressure.

2. A method of forming chain links for use in the treatment of wet slurry, comprising holding the link by endwise pressure, exerted above the longitudinal axis of the link and at opposite ends thereof, heating one of the sides of the link by the application to such side of oppositely arranged electrodes, and bending the side thereof inwardly toward the longitudinal axis thereof while hot by exerting pressure which is independent of the holding pressure.

3. A method of forming chain links for use in the treatment of wet slurry, comprising the support of assembled links upon an intermittently moving feed wheel, holding the link upon the wheel by endwise pressure, heating one of the sides thereof by the application to such side of oppositely arranged electrodes, and bending the side of the link inwardly toward the longitudinal axis thereof while hot by exerting pressure which is independent of the holding pressure.

4. A method of forming chain links for use in the treatment of wet slurry, comprising holding the link by endwise pressure, exerted above the longitudinal axis of the link and at opposite ends thereof, heating one of the sides of the link by the application to such side of oppositely arranged electrodes, and bending the side of the link inwardly toward the longitudinal axis thereof while hot by exerting pressure by means substantially enveloping three sides of the heated portion of the link, whereby the cross-sectional shape of the heated side will be maintained.

5. A method of forming chain links for use in the treatment of wet slurry, comprising holding the link by endwise pressure, exerted above the longitudinal axis of the link and at opposite ends thereof, heating one of the sides of the link by the application to such side of oppositely arranged electrodes and at a position intermediate its length, then bending such heated side, then heating the opposite side at substantially the same place in its length, and then bending the last mentioned side.

6. A method of forming the links of an assembled chain for use in the treatment of wet slurry, comprising heating one of the sides of one of the links at a position intermediate its length, then bending such heated side inwardly toward the center of the link, successively heating the corresponding side of each successive alternate link, then successively bending such side of each successive alternate link inwardly toward the center of such link, then heating the opposite side of one of the links which has one of its sides already bent, then bending this side, then successively heating the corresponding opposite side of each successive alternate link, and then successively bending the last mentioned side of each successive alternate link.

7. A method of forming the links of an assembled chain for use in the treatment of wet slurry, comprising heating one of the sides of one of the links at a position intermediate its length, then bending such heated side inwardly toward the center of the link, successively heating the corresponding side of each successive alternate link, then successively bending such side of each successive alternate link inwardly toward the center of such link, then heating the opposite side of one of the links which has one of its sides already bent, then bending this side, then successively heating the corresponding opposite side of each successive alternate link, then successively bending the last mentioned side of each successive alternate link, then successively heating one side of each of the untreated links intermediate the alternate links, then successively bending such heated sides, then successively heating the opposite sides of the intermediate links, and then successively bending such heated opposite sides.

FRANK E. STAHL.